United States Patent
Tai et al.

(10) Patent No.: US 10,359,558 B2
(45) Date of Patent: Jul. 23, 2019

(54) LIGHT GUIDE COMPOSITION, BACKLIGHT MODULE HAVING LIGHT GUIDE COMPOSITION AND DISPLAY DEVICE HAVING BACKLIGHT MODULE

(71) Applicants: Radiant Opto-Electronics (Suzhou) Co., Ltd., Jiangsu (CN); Radiant Opto-Electronics Corporation, Kaohsiung (TW)

(72) Inventors: Yung-Hui Tai, Kaohsiung (TW); Wei-Hsuan Chen, Kaohsiung (TW)

(73) Assignees: Radiant Opto-Electronics (Suzhou) Co., Ltd., Jiangsu (CN); Radiant Opto-Electronics Corporation, Kaohsiung (TW)

( * ) Notice: Subject to any disclaimer, the term of this patent is extended or adjusted under 35 U.S.C. 154(b) by 170 days.

(21) Appl. No.: 15/119,720

(22) PCT Filed: Dec. 29, 2015

(86) PCT No.: PCT/CN2015/099434
§ 371 (c)(1),
(2) Date: Aug. 17, 2016

(87) PCT Pub. No.: WO2017/031897
PCT Pub. Date: Mar. 2, 2017

(65) Prior Publication Data
US 2017/0261677 A1    Sep. 14, 2017

(30) Foreign Application Priority Data
Aug. 24, 2015   (CN) .......................... 2015 1 0519746

(51) Int. Cl.
*F21V 8/00* (2006.01)

(52) U.S. Cl.
CPC ......... *G02B 6/0043* (2013.01); *G02B 6/0036* (2013.01); *G02B 6/0061* (2013.01); *G02B 6/0065* (2013.01)

(58) Field of Classification Search
CPC .. G02B 6/0043; G02B 6/0036; G02B 6/0061; G02B 6/0065
(Continued)

(56) References Cited

U.S. PATENT DOCUMENTS

| 2007/0139582 A1 | 6/2007 | Numata et al. |
| 2011/0199785 A1 | 8/2011 | Shih et al. |
| 2014/0036528 A1* | 2/2014 | Kim et al. ............... G02B 6/26 362/606 |

FOREIGN PATENT DOCUMENTS

| CN | 102681049 A | 9/2012 |
| CN | 102966862 A | 3/2013 |

(Continued)

OTHER PUBLICATIONS

English Translation of CN-103115325-A (May 2013) (Year: 2013).*

*Primary Examiner* — Bao Q Truong
*Assistant Examiner* — Hana S Featherly
(74) *Attorney, Agent, or Firm* — CKC & Partners Co., LLC

(57) ABSTRACT

A light guide composition includes a substrate and a first microstructure layer. The substrate has a first main surface. The first microstructure layer is disposed on the first main surface. A refractive index of the substrate with respect to a first light wavelength is greater than a refractive index of the first microstructure layer with respect to the first light wavelength, a refractive index of the substrate with respect to a second light wavelength is smaller than a refractive index of the first microstructure layer with respect to the (Continued)

second light wavelength, and the first light wavelength is smaller than the second light wavelength.

20 Claims, 11 Drawing Sheets

(58) Field of Classification Search
USPC .......................................................... 362/619
See application file for complete search history.

(56) References Cited

FOREIGN PATENT DOCUMENTS

| | | |
|---|---|---|
| CN | 103017032 A | 4/2013 |
| CN | 103115325 A | 5/2013 |
| CN | 203069818 U | 7/2013 |
| CN | 203190212 U | 9/2013 |
| CN | 104459873 A | 3/2015 |
| CN | 205015500 U | 2/2016 |
| JP | 2011009125 A | 1/2011 |
| TW | 201309974 A | 3/2013 |

* cited by examiner

LIGHT GUIDE COMPOSITION, BACKLIGHT MODULE HAVING LIGHT GUIDE COMPOSITION AND DISPLAY DEVICE HAVING BACKLIGHT MODULE

RELATED APPLICATIONS

This application is the U.S. national phase under § 371 of International Application No. PCT/CN2015/099434 filed Dec. 29, 2015, which claims priority from China Patent Application Serial Number 201510519746.8, filed Aug. 24, 2015. The entire contents of each of which are incorporated by reference.

BACKGROUND

Field of Invention

The present invention relates to a light guide element and applications thereof. More particularly, the present invention relates to a light guide, a backlight module and a display device.

Description of Related Art

A backlight module mainly includes a light source and a light guide plate. Light generated from the light source can enter the light guide plate. However, after the light generated from the light source enters the light guide plate, light with shorter light wavelength (such as blue light) is likely to be absorbed by the light guide plate. Moreover, the amount of light with shorter light wavelength emitted from a light-emitting surface of the light guide plate is decreased with increase of a propagation distance of light within the light guide plate, thus resulting in color cast of the light with longer light wavelength (such as yellow light) on a portion of the light-emitting surface away from the light source.

SUMMARY

The invention provides a light guide composition and a backlight module, which can solve the problem of color cast.

According to the aforementioned object, a light guide composition is provided. The light guide composition includes a substrate and a first microstructure layer. The substrate has a first main surface. The first microstructure layer is disposed on the first main surface. A refractive index of the substrate with respect to a first light wavelength is greater than a refractive index of the first microstructure layer with respect to the first light wavelength, a refractive index of the substrate with respect to a second light wavelength is smaller than a refractive index of the first microstructure layer with respect to the second light wavelength, and the first light wavelength is smaller than the second light wavelength.

According to an embodiment of the present invention, the first light wavelength is smaller than or equal to 500 nm, and the second light wavelength is greater than 500 nm.

According to an embodiment of the present invention, the first light wavelength is greater than or equal to 400 nm and is smaller than or equal to 500 nm. The second light wavelength is greater than 500 nm and is smaller than or equal to 700 nm.

According to an embodiment of the present invention, an absolute value of a difference between the refractive index of the substrate with respect to the first light wavelength and the refractive index of the first microstructure layer with respect to the first light wavelength is smaller than or equal to 0.5.

According to an embodiment of the present invention, an absolute value of a difference between the refractive index of the substrate with respect to the second light wavelength and the refractive index of the first microstructure layer with respect to the second light wavelength is smaller than or equal to 0.5.

According to an embodiment of the present invention, the substrate further has a light-incident surface connected to the first main surface. The first microstructure layer includes a plurality of first microstructures, and there is a pitch between every two adjacent first microstructures, and the pitch is smaller with increase of a distance between the first microstructures and the light-incident surface.

According to an embodiment of the present invention, the first microstructures are dot structures.

According to an embodiment of the present invention, the first microstructures are strip structures, and an extending direction of the strip structures is parallel to the light-incident surface.

According to an embodiment of the present invention, the substrate further has a light-incident surface connected to the first main surface. The first microstructure layer includes a plurality of first microstructures, and a size of the first microstructure is greater with increase of a distance between the first microstructure and the light-incident surface.

According to an embodiment of the present invention, the first microstructures are dot structures.

According to an embodiment of the present invention, the first microstructures are strip structures, and an extending direction of the strip structures is parallel to the light-incident surface.

According to an embodiment of the present invention, the aforementioned light guide composition further includes a second microstructure layer disposed on a second main surface of the substrate, wherein the second main surface is opposite to the first main surface. The refractive index of the substrate with respect to the first light wavelength is greater than a refractive index of the second microstructure layer with respect to the first light wavelength, the refractive index of the substrate with respect to the second light wavelength is smaller than a refractive index of the second microstructure layer with respect to the second light wavelength.

According to an embodiment of the present invention, the second microstructure layer includes a plurality of second microstructures, and the second microstructures are dot structures.

According to an embodiment of the present invention, the substrate further has a light-incident surface connected to the first main surface and the second main surface. The second microstructure layer includes a plurality of second microstructures, the second microstructures are strip structures, and an extending direction of the strip structures is vertical to the light-incident surface.

According to the aforementioned object, a backlight module is provided. The backlight module includes the aforementioned light guide composition and a light source. The light source is used to provide light to the light guide composition.

According to the aforementioned object, a display device is provided. The display device includes the aforementioned backlight module and a display panel. The display panel is located in front of the light guide composition of the backlight module.

It can be known from the aforementioned embodiments of the present invention that, the light guide composition of the present invention includes the substrate and microstructure layer which are formed from different materials. Moreover, the refractive index of the substrate and the refractive index of the first microstructure layer can be varied according to different light wavelengths. Therefore, the propagation distance of the light with a shorter light wavelength can be increased, and the propagation distance of the light with a longer light wavelength can be decreased, so as to balance and blend different wavelengths of light to adjust the illumination color of the backlight module and avoid color cast in the backlight module.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
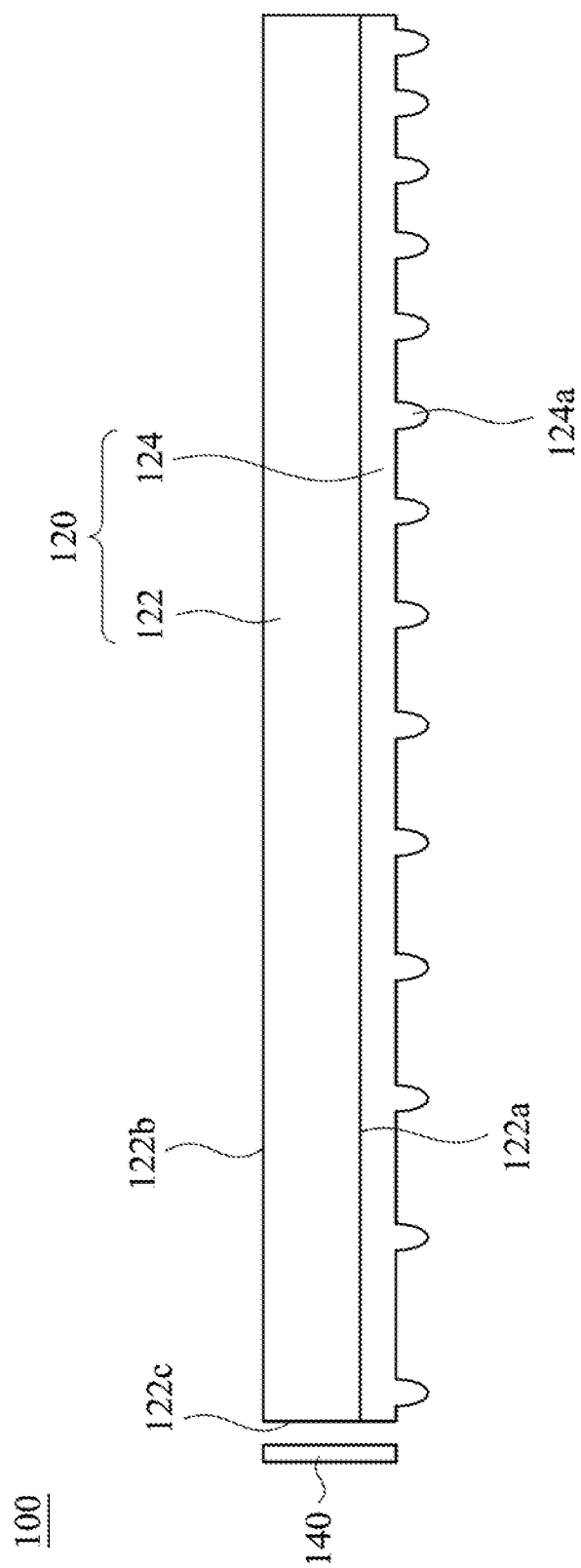
FIG. 1 is a schematic structural diagram showing a backlight module in accordance with a first embodiment of the present invention.

Referring to FIG. 1, FIG. 1 is a schematic structural diagram showing a backlight module 100 in accordance with a first embodiment of the present invention. The backlight module 100 of the present embodiment mainly includes a light guide composition 120 and a light source 140. The light source 140 is used to provide light to the light guide composition 120, and the light guide composition 120 can refract and reflect light generated from the light source 140, so as to increase luminance value and uniform illumination color of the backlight module 100.

It should be noted that, the light guide composition 120 can be a light guide film which has the same thickness as the light source 140 or has smaller thickness than the light source 140, so as to meet the trends of compactness and thickness of backlight modules. When the light guide composition 120 is used in the field of lamp industry, the light guide composition 120 is not required to meet the requirements of compactness and thickness for backlight modules. Instead, the light guide composition 120 may be a light guide plate with a greater thickness and formed by injection molding. Therefore, the light guide composition 120 described in the present invention is not limited to a "film", other types of the light guide composition 120, such as a "plate" or a "slice", shall fall within the scope of the present invention.

Referring to FIG. 1 again, the light guide composition 120 mainly includes a substrate 122 and a first microstructure layer 124 disposed on the substrate 122. The substrate 122 has a first main surface 122a, a second main surface 122b and a light-incident surface 122c. The light-incident surface 122c connects the first main surface 122a and the second main surface 122b, and the first main surface 122a is opposite to the second main surface 122b. In some embodiments, the first main surface 122a is a reflecting surface, and the second main surface 122b is a light-emitting surface. In the present embodiment, the first microstructure layer 124 is disposed on the first main surface 122a of the light guide composition 120.

Figure 2:
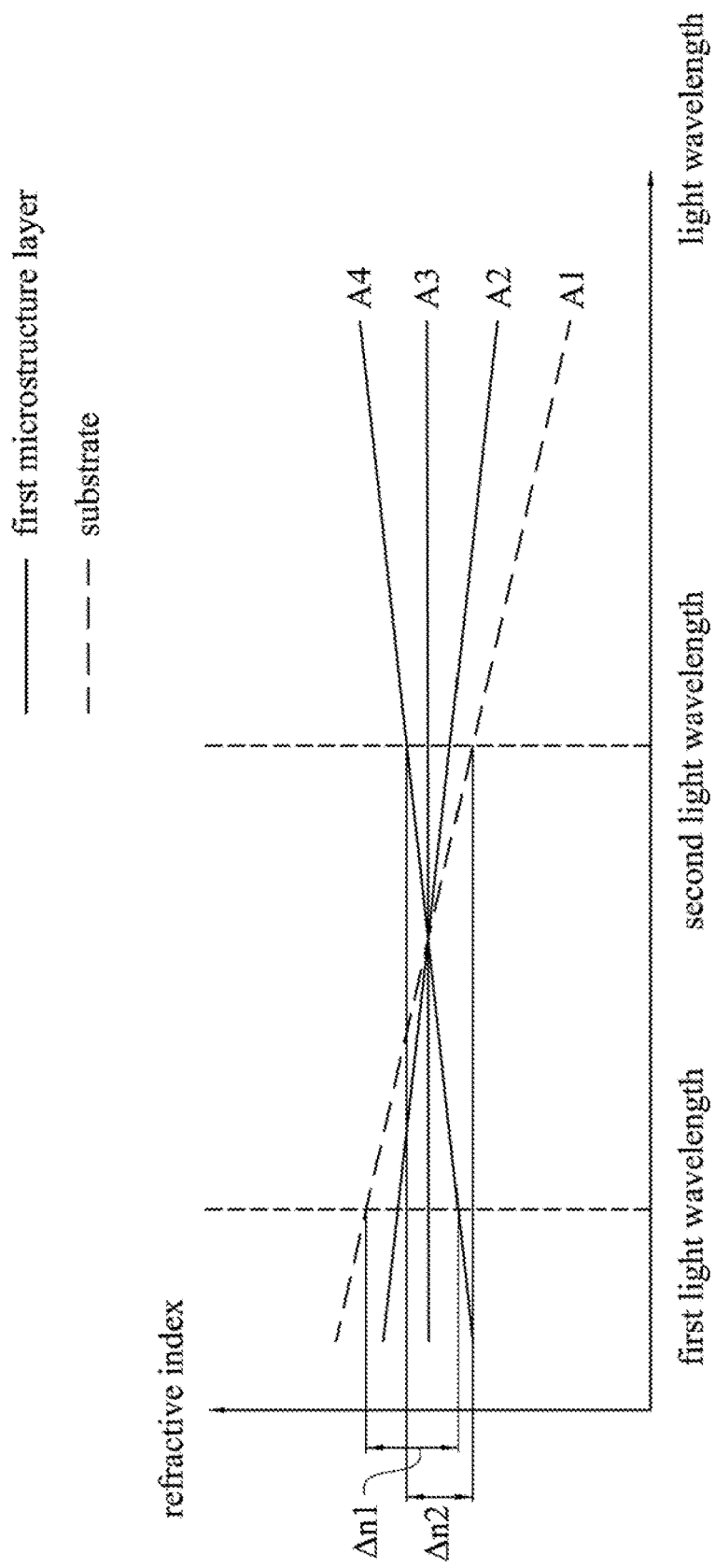
FIG. 2 is a schematic diagram showing relationships between refractive indices of a first microstructure layer and a substrate and light wavelengths incident thereto.
Figure 3:
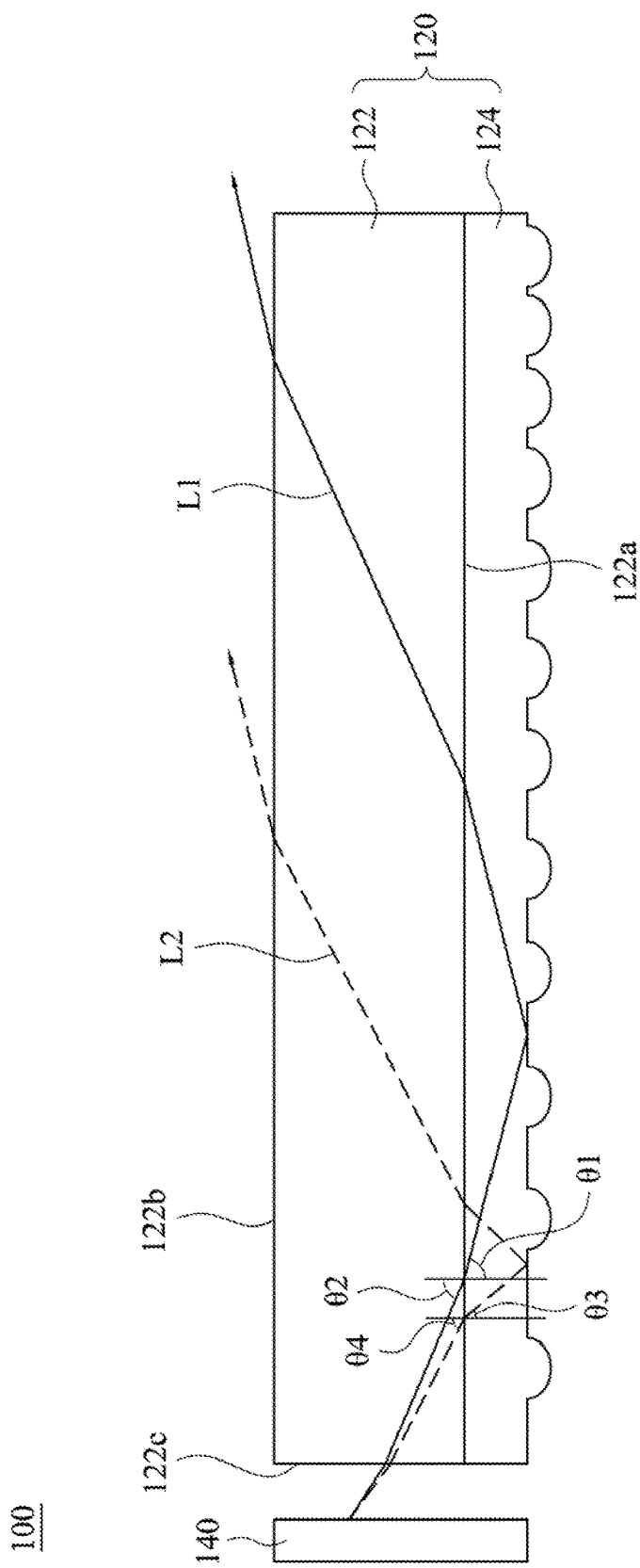
FIG. 3 is a schematic diagram showing a propagation path of light in the backlight module.

Simultaneously referring to FIG. 2 and FIG. 3, FIG. 2 is a schematic diagram showing relationships between refractive indices of a first microstructure layer 124 and a substrate 122 and light wavelengths incident thereto, and FIG. 3 is a schematic diagram showing a propagation path of light in the backlight module 100. In the present embodiment, a material of the substrate 122 is different from a material of the first microstructure layer 124. In addition, a broken line A1 shown in FIG. 2 represents a relationship between a refractive index of the substrate 122 and a light wavelength incident thereto. Solid lines A2, A3 and A4 respectively represent relationships between refractive indices of the first microstructure layers 124 of three different embodiments and light wavelengths incident thereto. In the present embodiment, a refractive index of the substrate 122 with respect to a first light wavelength is greater than a refractive index of the first microstructure layer 124 with respect to the first light wavelength. A refractive index of the substrate 122 with respect to a second light wavelength is smaller than a refractive index of the first microstructure layer 124 with respect to the second light wavelength. Moreover, the first light wavelength is smaller than the second light wavelength.

In some embodiments, as shown by the solid line A4 in FIG. 2, an absolute value of a difference Δn1 between the refractive index of the substrate 122 with respect to the first light wavelength and the refractive index of the first microstructure layer 124 with respect to the first light wavelength is equal to 0.5. Moreover, an absolute value of a difference Δn2 between the refractive index of the substrate 122 with respect to the second light wavelength and the refractive index of the first microstructure layer 124 with respect to the second light wavelength is equal to 0.5. In other embodiments, as shown by the solid lines A2 and A3, an absolute value of a difference between the refractive index of the substrate 122 with respect to the first light wavelength and the refractive index of the first microstructure layer 124 with respect to the first light wavelength is smaller than 0.5. Moreover, an absolute value of a difference between the refractive index of the substrate 122 with respect to the second light wavelength and the refractive index of the first microstructure layer 124 with respect to the second light wavelength is smaller than 0.5.

Referring to FIG. 2 and FIG. 3 again, because the refractive index of the substrate 122 with respect to the first light wavelength is greater than the refractive index of the first microstructure layer 124 with respect to the first light wavelength, an refraction angle θ1 of light with the first light wavelength L1 generated from the light source 140 entering the first microstructure layer 124 from the substrate 122 is greater than the incident angle θ2. Therefore, when the light with the first light wavelength L1 enters the first microstructure layer 124, the deviation of the light with the first light wavelength L1 relative to the normal line parallel to the light-incident surface 122c of the substrate 122 is increased since the refraction angle θ1 becomes greater, so that before entering the substrate 122 again and emitted from the second main surface 122b, the light with the first light wavelength L1 travels longer distance in the first microstructure layer 124. Moreover, because the refractive index of the substrate 122 with respect to the second light wavelength is smaller than the refractive index of the first microstructure layer 124 with respect to the second light wavelength, an refraction angle θ3 of light with the second light wavelength L2 generated from the light source 140 entering the first microstructure layer 124 from the substrate 122 is smaller than the incident angle θ4. Therefore, when the light with the second light wavelength L2 enters the first microstructure layer 124, the deviation of the light with the second light wavelength L2 relative to the normal line parallel to the light-incident surface 122c of the substrate 122 is decreased since the refraction angle θ3 becomes smaller, so that before entering the substrate 122 again and emitted from the second main surface 122b, the light with the second light wavelength L2 travels shorter distance in the first microstructure layer 124. Therefore, propagation distances and refraction angles of the light with the first light wavelength L1 and the light with the second light wavelength L2 can be controlled by varying refractive index of the substrate 122 and the refractive index of the first microstructure layer 124 according to different light wavelengths, thus avoiding color cast in the backlight module 100.

In one embodiment, the light with the first light wavelength L1 and the light with the second light wavelength L2 can be complementary color light to each other. For example, the light with the first light wavelength L1 can be blue light, and the light with the second light wavelength L2 can be yellow light. In the a conventional backlight module using a conventional light guide plate instead of the light guide composition 120 of the present invention, after entering the light guide plate, the amount of light with shorter light wavelength (such as blue light) absorbed by the light guide plate is increased with increase of a propagation distance of light within the light guide plate, which will cause color cast of the light with longer light wavelength (such as yellow light) on the portion of the light-emitting surface away from the light source 140. Therefore, the substrate 122 and the first microstructure layer 124 of the light guide composition 120 can be designed to have different refractive indices according to different light wavelengths, so that the propagation distance of light with shorter light wavelength (such as blue light) can be increased, and the propagation distance of light with longer light wavelength (such as yellow light) can be decreased, thus balancing and blending different wavelengths of light to adjust the illumination color of the backlight module 100 and solving the problem of color cast.

In some embodiments, the first light wavelength is greater than or equal to 400 nm and is smaller than or equal to 500 nm. The second light wavelength is greater than 500 nm and is smaller than or equal to 700 nm.

Figure 4:
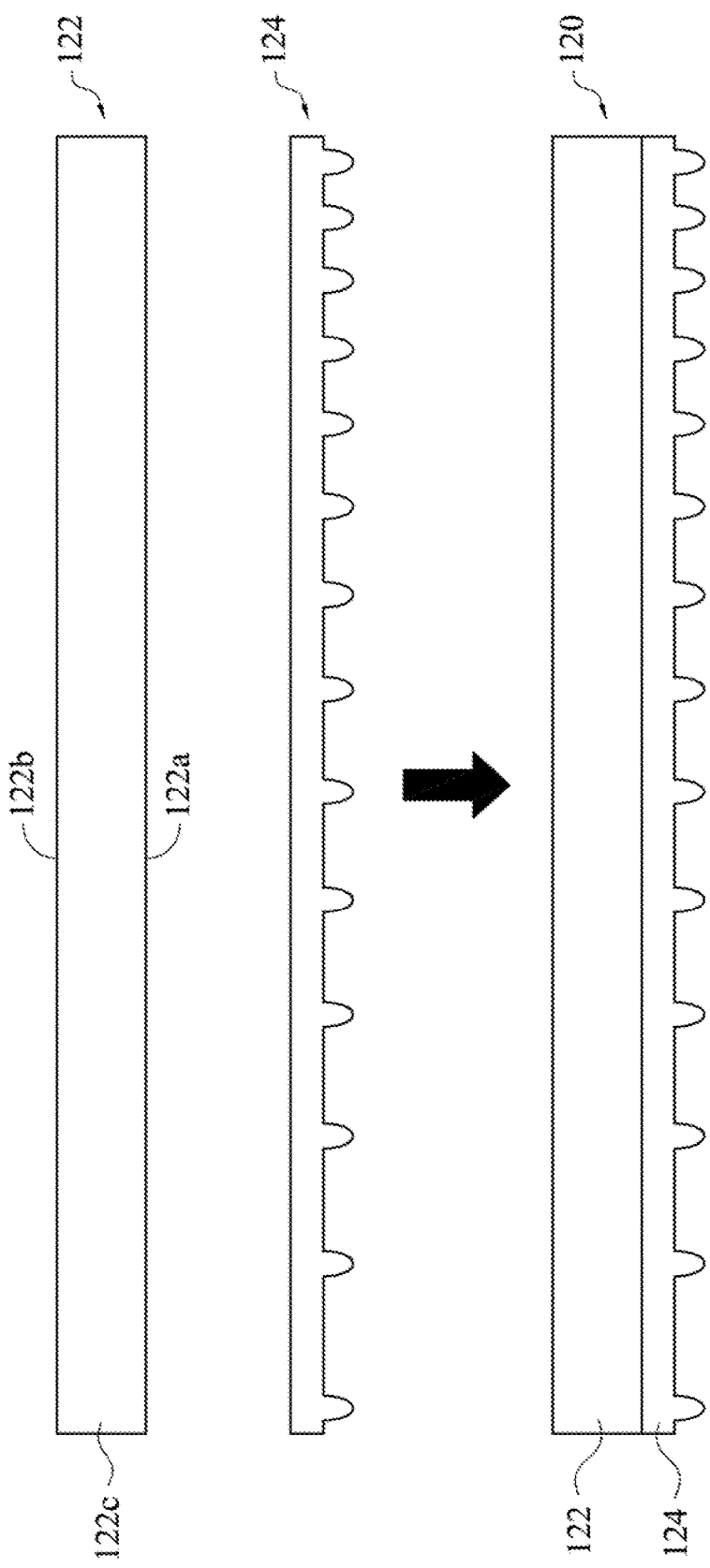
FIG. 4 is a schematic diagram showing a light guide composition in manufacturing process in accordance with the first embodiment of the present invention.

Referring to FIG. 4, FIG. 4 is a schematic diagram showing the light guide composition 120 in manufacturing process in accordance with the first embodiment of the present invention. In present embodiment, the first microstructure layer 124 of the light guide composition 120 is formed by using ultraviolet to harden UV-cured acrylate resin which is coated on the first main surface 122a of the substrate 122. In other words, the first microstructure layer 124 is a coating layer which has very thin thickness, so as to meet the requirement of thinness for backlight modules.

Figure 5A:
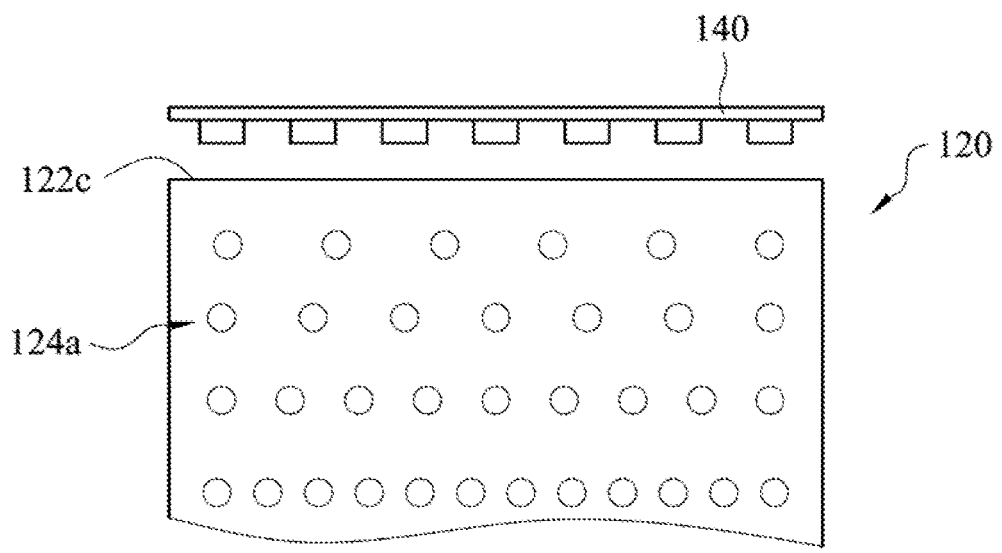
FIG. 5A-FIG. 5E are schematic diagrams showing different arrangements of first microstructures in accordance with the first embodiment of the present invention.
Figure 5B:
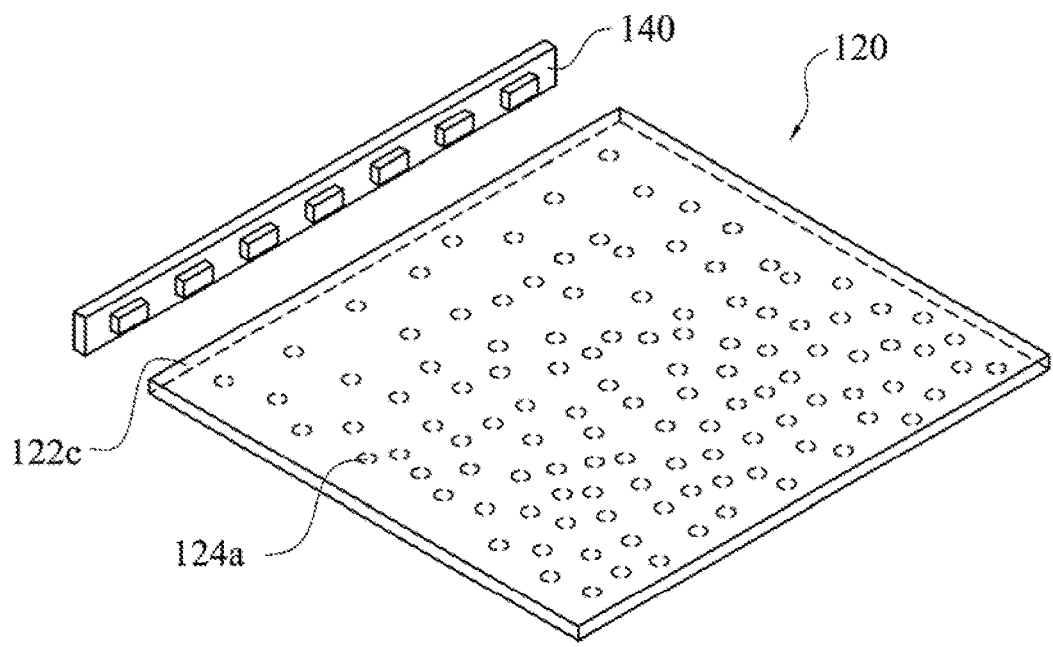
Figure 5C:
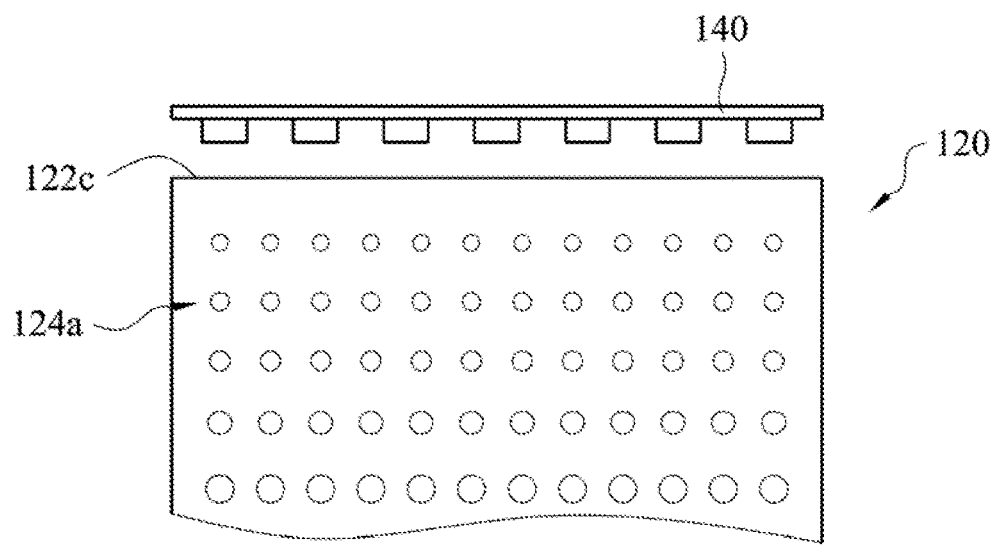
Figure 5D:
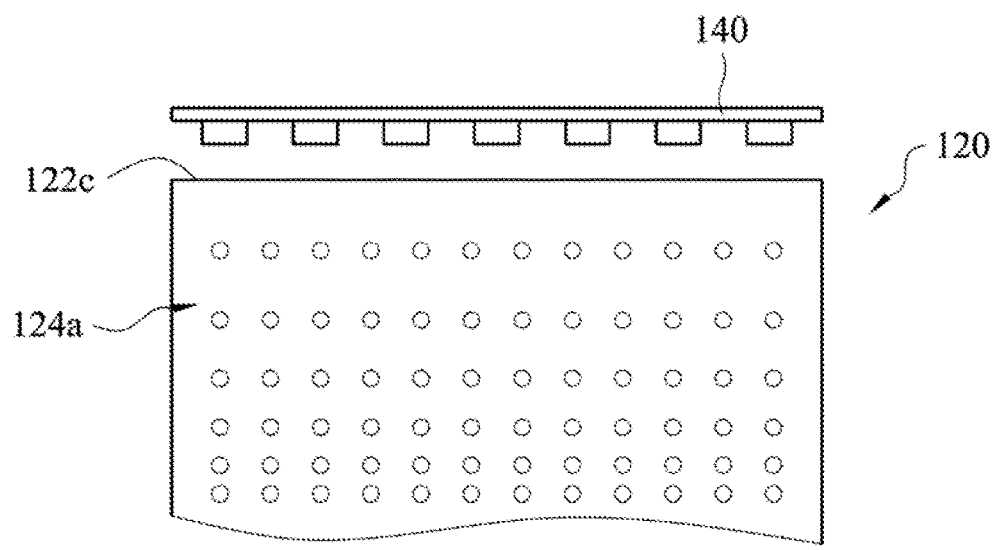
Figure 5E:
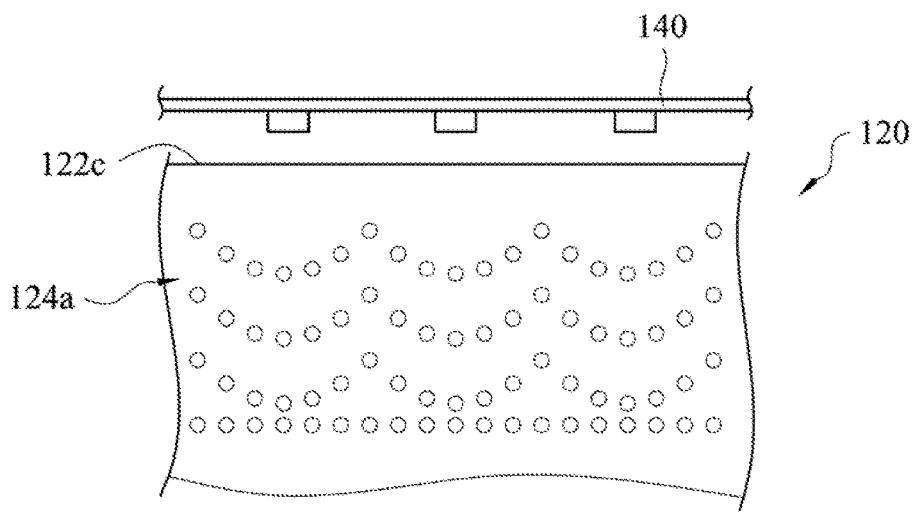

Simultaneously referring to FIG. 1 and FIG. 5A-FIG. 5E, FIG. 5A-FIG. 5E are schematic diagrams showing different arrangements of first microstructures 124a in accordance with the first embodiment of the present invention. In some embodiments, the first microstructure layer 124 includes plural first microstructures 124a, and these first microstructures 124a are dot structures. In the embodiment of FIG. 5A, each of the first microstructures 124a has the same size and are arranged to form a plurality of microstructure rows. Each of the microstructure rows is substantially parallel to an edge of the light-incident surface 122c of the light guide plate 120. Moreover, the first microstructures 124a of the microstructure rows near the light source 140 are sparsely arranged, and the first microstructures 124a of the microstructure rows away from light source 140 are densely arranged. In other words, the arrangement density of each microstructure 140a is greater with increase of the distance between the microstructure row and the light source 140. In addition, in the embodiment shown in FIG. 5A, every two adjacent microstructure rows are spaced equidistantly. In other embodiments, as shown in FIG. 5B, the first microstructures 124a can be randomly arranged, and there is a pitch between every two adjacent first microstructures 124a, and the pitch is smaller with increase of a distance between the first microstructure 124a and the light source 140 (or the light-incident surface 122c).

In some embodiments, the sizes of the first microstructures 124a are greater with increase of a distance between the first microstructure 124a and the light source 140 (or the light-incident surface 122c). In the embodiment shown in FIG. 5C, the sizes of the first microstructures 124a of the microstructure rows near the light source 140 are smaller, and the sizes of the first microstructures 124a of the microstructure rows away from the light source 140 are greater. In the embodiment shown in FIG. 5D, the sizes of the first microstructures 124a are the same, and a pitch between two adjacent microstructure rows is smaller with increase of the distance between the microstructure row and the light source 140. In the embodiment shown in FIG. 5E, the sizes of the first microstructures 124a are the same, and the microstructure rows near the light source 140 are arranged radially with respect to the light emitted from the light source 140. Therefore, light emitted from the light guide plate 120 can be more uniform by using different arrangements of the first microstructures 124a.

Figure 6:
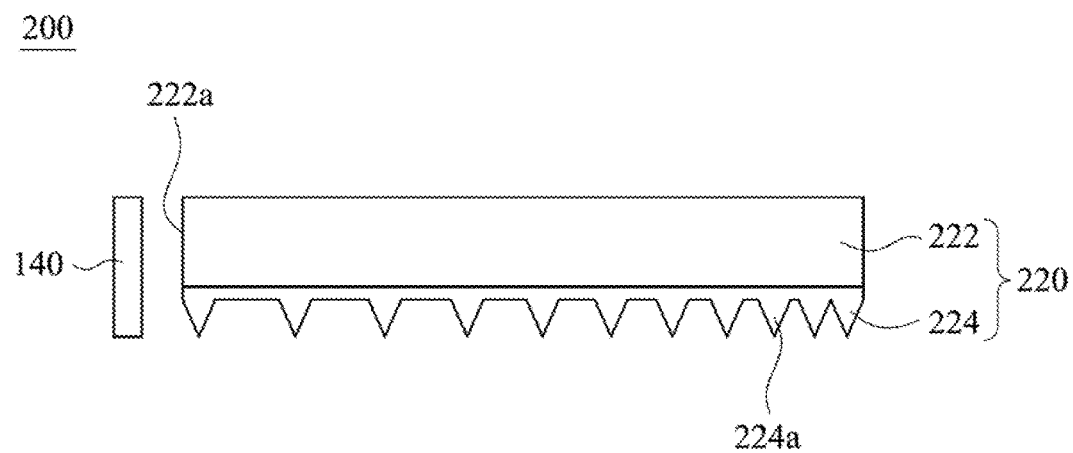
FIG. 6 is a schematic structural diagram showing a backlight module in accordance with a second embodiment of the present invention.

Referring to FIG. 6, FIG. 6 is a schematic structural diagram showing a backlight module 200 in accordance with a second embodiment of the present invention. Structure of the backlight module 200 of the present embodiment is similar to that of the backlight module 100, and the main difference therebetween is that a light guide composition 220 of the backlight module 200 has different structure. As shown in FIG. 6, the light guide composition 220 includes a substrate 222 and a first microstructure layer 224 disposed on the substrate 222. The first microstructure layer 224 includes plural first microstructures 224a, and each of the first microstructures 224a is a V-shaped strip structure. As shown in FIG. 6, an extending direction of the first microstructures 224a is parallel to an extending direction of a light-incident surface 222a of the substrate 222, thereby achieving the same effect as described above, which will not be described herein.

Figure 7:
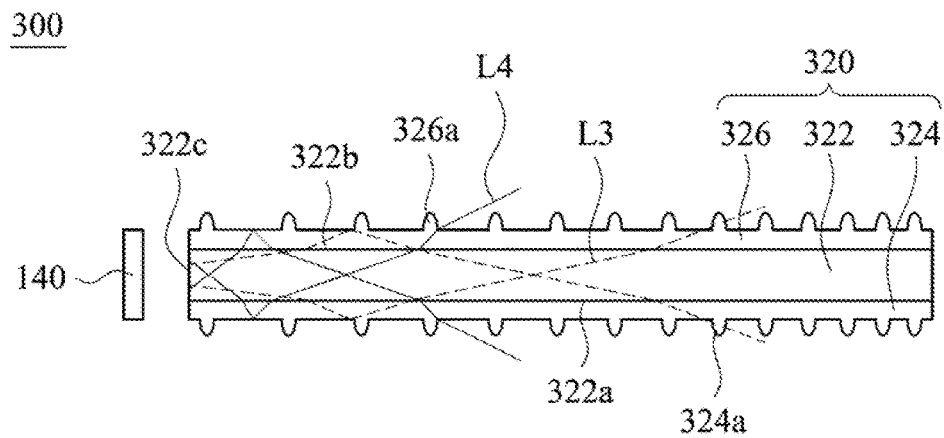
FIG. 7 is a schematic structural diagram showing a backlight module in accordance with a third embodiment of the present invention.

Referring to FIG. 7, FIG. 7 is a schematic structural diagram showing a backlight module 300 in accordance with a third embodiment of the present invention. Structure of the backlight module 300 of the present embodiment is similar to that of the backlight module 100, and the main difference therebetween is that a light guide composition 320 of the backlight module 300 has different structure. As shown in FIG. 7, the light guide composition 320 includes a substrate 322, a first microstructure layer 324 and a second microstructure layer 326. The substrate 322 has a first main surface 322a, a second main surface 322b and a light-incident surface 322c. The first main surface 322a is opposite to the second main surface 322b, and the light-incident surface 322c connects the first main surface 322a and the second main surface 322b. Moreover, the first microstructure layer 324 and the second microstructure layer 326 are respectively disposed on the first main surface 322a and the second main surface 322b.

Figure 8:
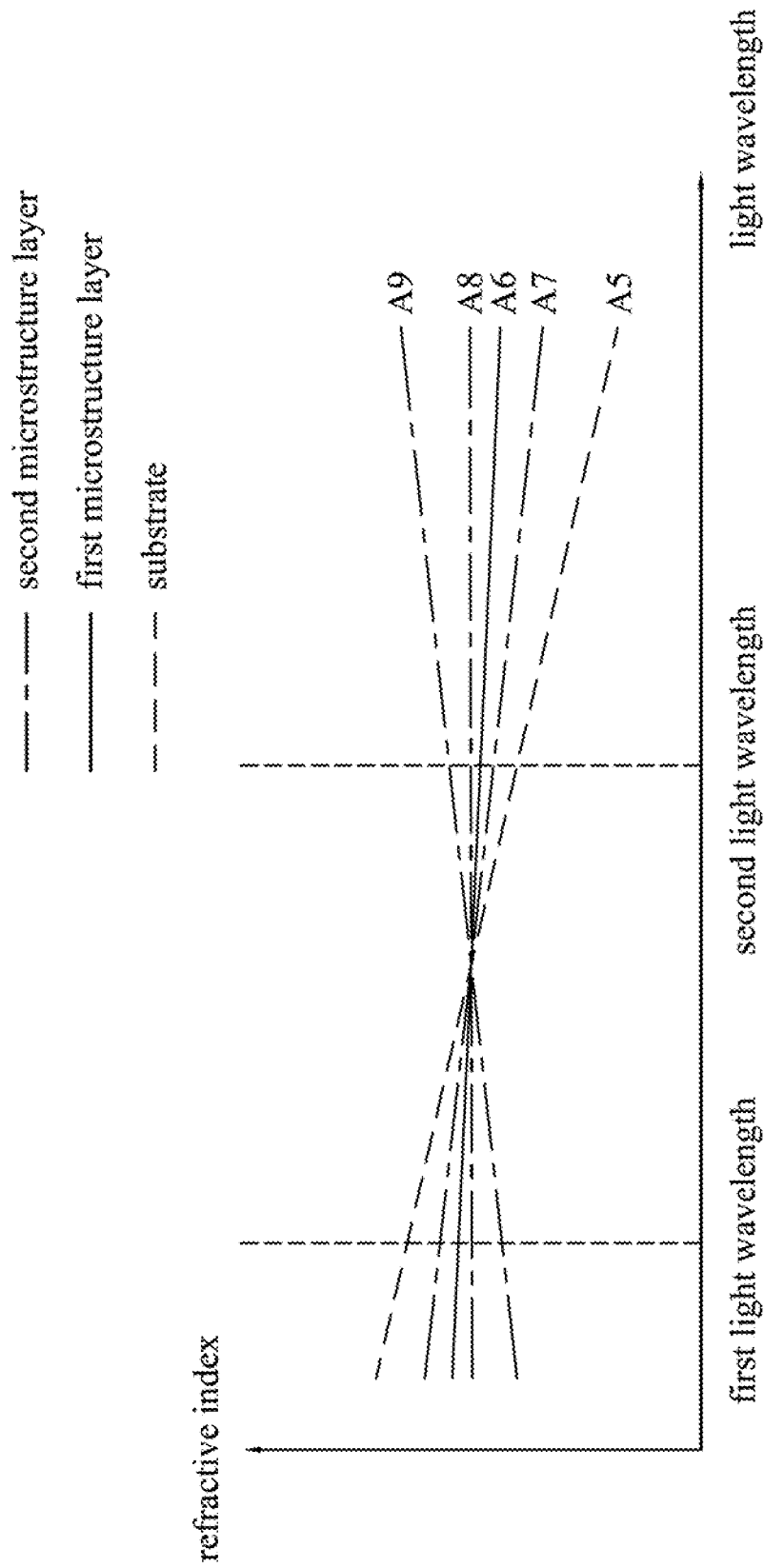
FIG. 8 is a schematic diagram showing relationships between refractive indices of a first microstructure layer, a second microstructure layer and a substrate and light wavelengths incident thereto.

Referring to FIG. 7 and FIG. 8, FIG. 8 is a schematic diagram showing relationships between refractive indices of a first microstructure layer 324, a second microstructure layer 326 and a substrate 322 and light wavelengths incident thereto. In the embodiment shown in FIG. 7, material of the substrate 322 is different from material of the first microstructure layer 324 and material of the second microstructure layer 326. In some embodiments, the material of the first microstructure layer 324 can be the same or different from that of the second microstructure layer 326. Moreover, as shown in FIG. 8, broken line A5 shown in FIG. 8 represents a relationship between a refractive index of the substrate 322 and a light wavelength incident thereto, solid line A6 shown in FIG. 8 represents a relationship between a refractive index of the first microstructure layer 324 and a light wavelength incident thereto, and chain lines A7, A8 and A9 respectively represent relationships between refractive indices of the second microstructure layers 326 of three different embodiments and light wavelengths incident thereto. As shown in FIG. 8, a refractive index of the substrate 322 with respect to a first light wavelength is greater than refractive indices of the first microstructure layer 324 and the second microstructure layer 326 with respect to the first light wavelength. A refractive index of the substrate 322 with respect to a second light wavelength is smaller than refractive indices of the first microstructure layer 324 and the second microstructure layer 326 with respect to the second light wavelength. Moreover, the first light wavelength is smaller than the second light wavelength. Therefore, the refractive index of the substrate 322, the refractive index of the first microstructure layer 324 and the refractive index of the second microstructure layer 326 can be varied according to different light wavelengths, so as to increase propagation distance of the light with shorter light wavelength (i.e. the first light wavelength L3) and decrease propagation distance of the light with longer light wavelength (i.e. the first light wavelength L4). In other words, the light guide composition 320 of the third embodiment shown in FIG. 7 has the second microstructure layer 326 which can increase the refraction angle of light with the shorter light wavelength, so as to increase the propagation distance thereof, thus balancing and blending different wavelengths of light to adjust the illumination color of the backlight module 100 and avoiding color cast in the backlight module 100.

In some embodiments, as shown in FIG. 8, the chain line A7 showing the relationship between the refractive index of the second microstructure layer 326 and the light wavelength incident thereto is located between the broken line A5 and the solid line A6, in which the broken line A5 shows the relationship between the refractive index of the substrate 322 and the light wavelength incident thereto, and the solid line A6 shows the relationship between the refractive index of the first microstructure layer 324 and the light wavelength incident thereto. In other embodiments, for example, relation lines A8 and A9 showing the relationships between the refractive indices of the second microstructure layers 326 and the light wavelengths incident thereto are located outside an area defined between the broken line A5 and the solid line A6, in which the broken line A5 shows the relationship between the refractive index of the substrate 322 and the light wavelengths incident thereto, and the solid line A6 shows the relationship between the refractive index the first microstructure layer 324 and the light wavelengths incident thereto.

As shown in FIG. 7, in the present embodiment, the first microstructure layer 324 includes plural first microstructures 324a, and the second microstructure layer 326 includes plural second microstructures 326a. In the present embodiment, the first microstructures 324a and the second microstructures 326a are dot structures, and the arrangement of the dot structures is similar to that of the embodiments shown in FIG. 5A-FIG. 5E, thereby achieving the same effect as described above, which will not be described herein.

Figure 9:
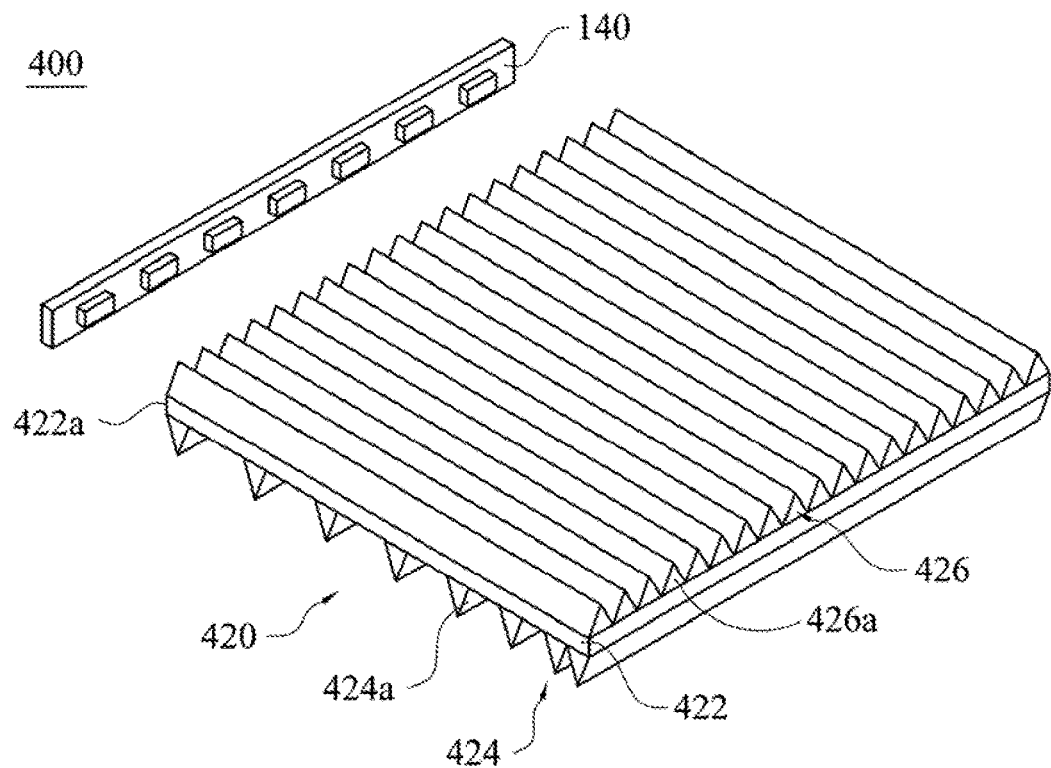
FIG. 9 is a schematic structural diagram showing a backlight module in accordance with a fourth embodiment of the present invention.

Referring to FIG. 9, FIG. 9 is a schematic structural diagram showing a backlight module 400 in accordance with a fourth embodiment of the present invention. Structure of the backlight module 400 of the present embodiment is similar to that of the backlight module 300, and the main difference therebetween is that a light guide composition 420 of the backlight module 400 has different structure. As shown in FIG. 9, the light guide composition 420 includes a substrate 422, a first microstructure layer 424 and a second microstructure layer 426. The first microstructure layer 424 includes plural first microstructures 424a, and the second microstructure layer 426 includes plural second microstructures 426a. The first microstructures 424a and the second microstructures 426a are strip structures. As shown in FIG. 9, in the present embodiment, an extending direction of the first microstructures 424a is parallel to an extending direction of a light-incident surface 422a of the substrate 422, and an extending direction of the second microstructures 426a is vertical to the extending direction of the light-incident surface 422a of the substrate 422, so as to solve the problem of non-uniform illumination in the backlight module 400.

Figure 10:
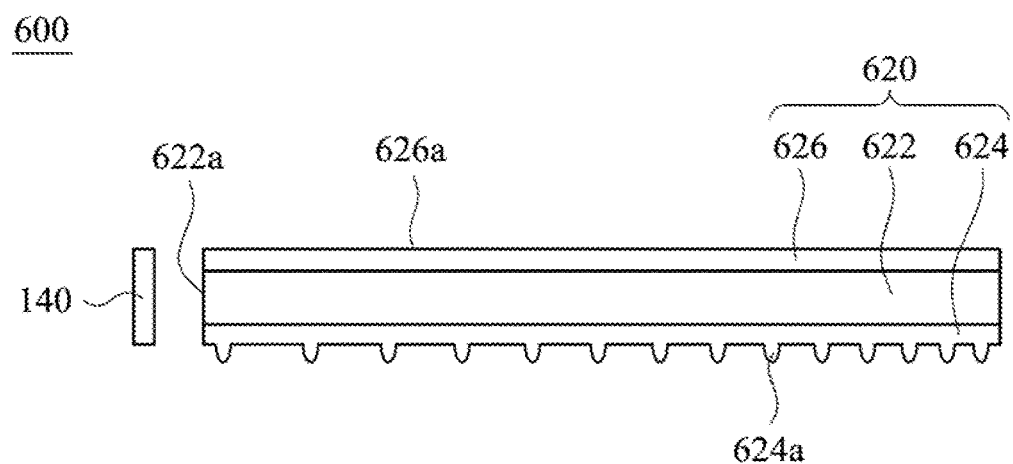
FIG. 10 is a schematic structural diagram showing a backlight module in accordance with a fifth embodiment of the present invention.

Referring to FIG. 10, FIG. 10 is a schematic structural diagram showing a backlight module 600 in accordance with a fifth embodiment of the present invention. Structure of the backlight module 600 of the present embodiment is similar to that of the backlight module 400, and the main difference therebetween is that a light guide composition 620 of the backlight module 600 has different structure. As shown in FIG. 10, the light guide composition 620 includes a substrate 622, a first microstructure layer 624 and a second microstructure layer 626. The first microstructure layer 624 includes plural first microstructures 624a. The first microstructures 624a are dot structures, and the arrangement of the dot structures is similar to that of the embodiments shown in FIG. 5A-FIG. 5E, thereby achieving the same effect as described above, which will not be described herein. The second microstructure layer 626 includes plural second microstructures 626a, and the second microstructures 626a are strip structures. As shown in FIG. 10, an extending direction of the second microstructures 624a is vertical to an extending direction of a light-incident surface 622a of the light guide composition 620, so as to solve the problem of non-uniform illumination in the backlight module 400.

Figure 11:
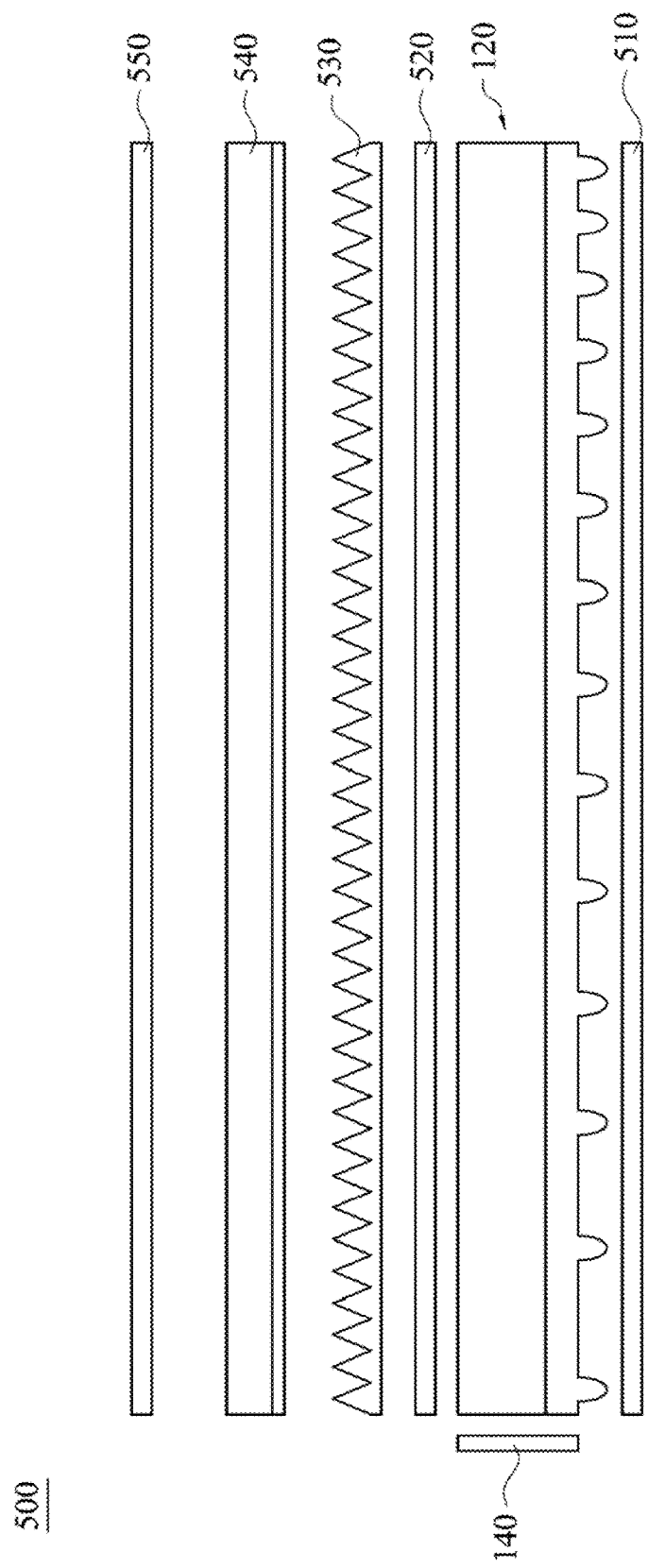
FIG. 11 is a schematic structural diagram showing a backlight module in accordance with a sixth embodiment of the present invention.

Referring to FIG. 11, FIG. 11 is a schematic structural diagram showing a backlight module 500 in accordance with a sixth embodiment of the present invention. Structure of the backlight module 500 of the present embodiment is similar to that of the backlight module 100 shown in FIG. 1, and the main difference therebetween is that the backlight module 500 further includes a reflector 510, a lower diffuser 520, a lower prism sheet 530, an upper prism sheet 540 and an upper diffuser 550. The reflector 510 is disposed under the light guide composition 120, the lower diffuser 520, the lower prism sheet 530, the upper prism sheet 540 and the upper diffuser 550 are sequentially disposed above the light guide composition 120, thus enabling the backlight module 500 to achieve better optical effect.

Figure 12:
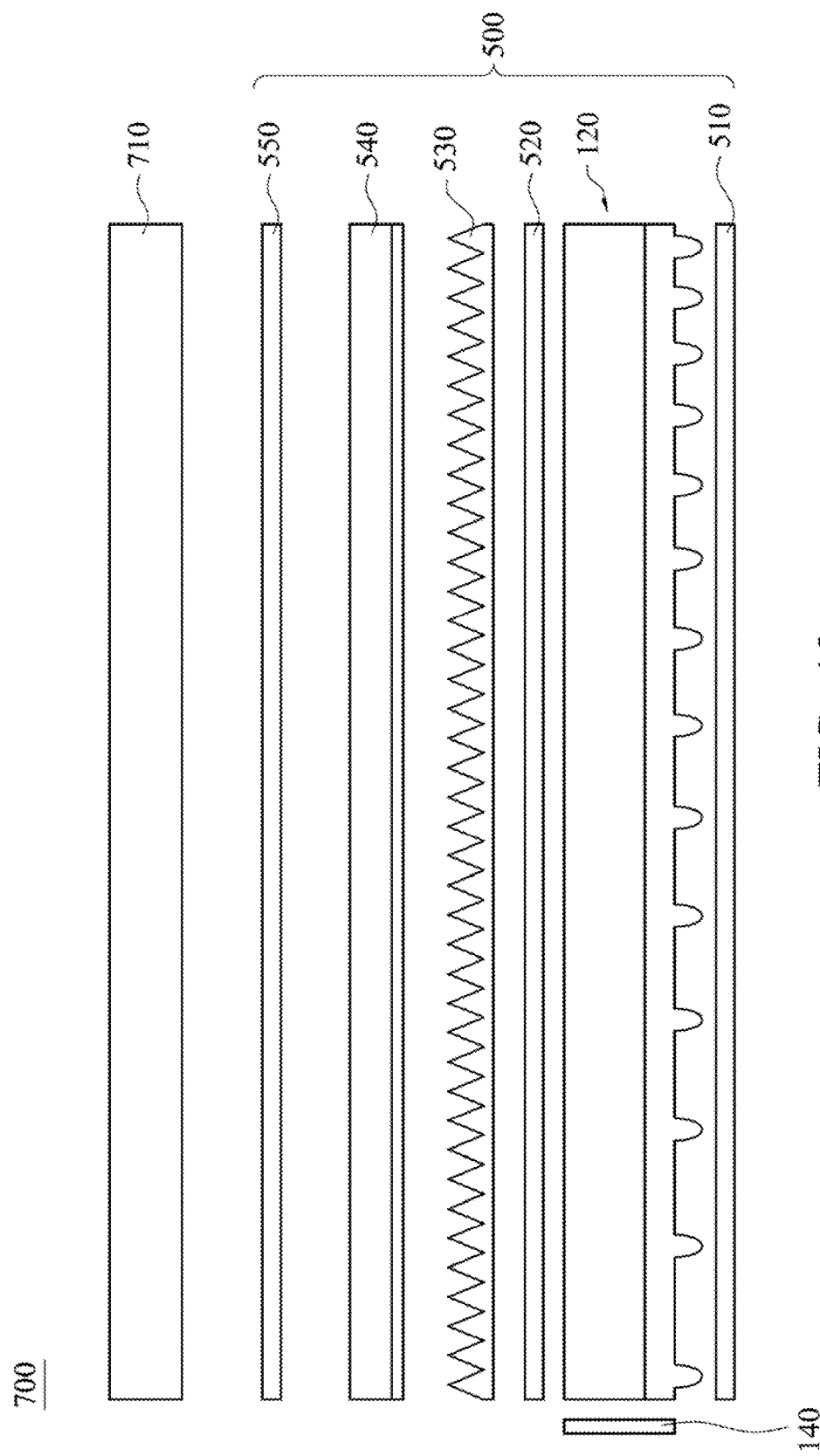
FIG. 12 is a schematic structural diagram showing a display device in accordance with an embodiment of the present invention.

Referring to FIG. 12, FIG. 12 is a schematic structural diagram showing a display device 700 in accordance with an embodiment of the present invention. The display device 700 of the present embodiment includes the backlight module 500 as shown in FIG. 11 and a display panel 710. As shown FIG. 12, the display panel 710 is disposed in front of the backlight module 500. After entering the light guide composition 120, light generated from the light source 140 sequentially passes through the light guide composition 120, the lower diffuser 520, the lower prism sheet 530, the upper prism sheet 540 and the upper diffuser 550, and then enters the display panel, so as to achieve the aforementioned object.

It can be known from the aforementioned embodiments of the present invention that, the light guide composition of the present invention includes the substrate and microstructure layer which are formed from different materials. Moreover, the refractive index of the substrate and the refractive index of the first microstructure layer can be varied according to different light wavelengths. Therefore, the propagation distance of the light with a shorter light wavelength can be increased, and the propagation distance of the light with a longer light wavelength can be decreased, so as to balance and blend different wavelengths of light to adjust the illumination color of the backlight module and avoid color cast in the backlight module.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light guide composition, comprising:
    a substrate having a first main surface; and
    a first microstructure layer disposed on the first main surface;
    wherein a refractive index of the substrate with respect to a first light wavelength is greater than a refractive index of the first microstructure layer with respect to the first light wavelength, a refractive index of the substrate with respect to a second light wavelength is smaller than a refractive index of the first microstructure layer with respect to the second light wavelength, and the first light wavelength is smaller than the second light wavelength;
    wherein the first microstructure layer comprises a plurality of first microstructures, and a continuous layer with a top face, a bottom face, and a thickness which is defined by the top face and the bottom face, and light is refracted while entering and being emitted from the continuous layer of the first microstructure layer;
    wherein the top face of the continuous layer is connected to the first main surface of the substrate;
    wherein the first microstructures are disposed on the bottom face of the continuous layer; and
    wherein the first microstructures are exposed in the air and are free from contact by any other medium.

2. The light guide composition of claim 1, wherein the first light wavelength is smaller than or equal to 500 nm, and the second light wavelength is greater than 500 nm.

3. The light guide composition of claim 1, wherein
    the first light wavelength is greater than or equal to 400 nm and is smaller than or equal to 500 nm; and
    the second light wavelength is greater than 500 nm and is smaller than or equal to 700 nm.

4. The light guide composition of claim 1, wherein an absolute value of a difference between the refractive index of the substrate with respect to the first light wavelength and the refractive index of the first microstructure layer with respect to the first light wavelength is smaller than or equal to 0.5.

5. The light guide composition of claim 1, wherein an absolute value of a difference between the refractive index of the substrate with respect to the second light wavelength and the refractive index of the first microstructure layer with respect to the second light wavelength is smaller than or equal to 0.5.

6. The light guide composition of claim 1, wherein
    the substrate further has a light-incident surface connected to the first main surface; and
    there is a pitch between every two adjacent first microstructures, and the pitch is smaller with increase of a distance between the first microstructure and the light-incident surface.

7. The light guide composition of claim 6, wherein the first microstructures are dot structures.

8. The light guide composition of claim 6, wherein the first microstructures are strip structures, and an extending direction of the strip structures is parallel to the light-incident surface.

9. The light guide composition of claim 1, wherein
    the substrate further has a light-incident surface connected to the first main surface; and
    a size of the first microstructure is greater with increase of a distance between the first microstructure and the light-incident surface.

10. The light guide composition of claim 9, wherein the first microstructures are dot structures.

11. The light guide composition of claim 9, wherein the first microstructures are strip structures, and an extending direction of the strip structures is parallel to the light-incident surface.

12. The light guide composition of claim 1, further comprising a second microstructure layer disposed on a second main surface of the substrate, wherein the second main surface is opposite to the first main surface;
wherein the refractive index of the substrate with respect to the first light wavelength is greater than a refractive index of the second microstructure layer with respect to the first light wavelength, the refractive index of the substrate with respect to the second light wavelength is smaller than a refractive index of the second microstructure layer with respect to the second light wavelength.

13. The light guide composition of claim 12, wherein the second microstructure layer comprises a plurality of second microstructures, and the second microstructures are dot structures.

14. The light guide composition of claim 12, wherein
the substrate further has a light-incident surface connected to the first main surface and the second main surface; and
the second microstructure layer comprises a plurality of second microstructures, the second microstructures are strip structures, and an extending direction of the strip structures is vertical to the light-incident surface.

15. A backlight module, comprising:
a light guide composition as claimed in claim 12, and
a light source used to provide light to the light guide composition.

16. A display device, comprising:
a backlight module as claimed in claim 15; and
a display panel located in front of the light guide composition of the backlight module.

17. A backlight module, comprising:
a light guide composition as claimed in claim 1, and
a light source used to provide light to the light guide composition.

18. A display device, comprising:
a backlight module as claimed in claim 17; and
a display panel located in front of the light guide composition of the backlight module.

19. A backlight module, comprising:
a light guide composition; and
a light source used to provide light to the light guide composition;
wherein the light guide composition comprises:
a substrate having a first main surface; and
a first microstructure layer disposed on the first main surface;
wherein a refractive index of the substrate with respect to a first light wavelength is greater than a refractive index of the first microstructure layer with respect to the first light wavelength, and a refractive index of the substrate with respect to a second light wavelength is smaller than a refractive index of the first microstructure layer with respect to the second light wavelength, and the first light wavelength is smaller than the second light wavelength;
wherein the first microstructure layer comprises a continuous layer with a thickness, and light is refracted while entering and being emitted from the continuous layer of the first microstructure layer;
wherein the substrate has a second main surface opposite to the first main surface, and a light-incident surface connecting the first main surface and the second main surface;
wherein the first microstructure layer has a top surface adjacent to the first main surface of the substrate;
wherein the light source provides light which enters the substrate through the light-incident surface;
wherein a first refraction angle of the light with the first light wavelength which enters the first microstructure layer from the substrate through the first main surface of the substrate is greater than a first incident angle of the light with the first light wavelength incident on the top surface of the first microstructure layer after passing through the first main surface of the substrate; and
wherein a second refraction angle of the light with the second wavelength which enters the first microstructure layer from the substrate through the first main surface of the substrate is smaller than a second incident angle of the light with the second wavelength incident on the top surface of the first microstructure layer after passing through the first main surface of the substrate.

20. A display device, comprising:
a backlight module as claimed in claim 19; and
a display panel located in front of the light guide composition of the backlight module.

* * * * *